(12) United States Patent
Steele

(10) Patent No.: US 7,603,862 B2
(45) Date of Patent: Oct. 20, 2009

(54) COMBUSTION DEVICE

(75) Inventor: David Steele, Bristol (GB)

(73) Assignee: Rolls-Royce PLC, London (GB)

( * ) Notice: Subject to any disclaimer, the term of this patent is extended or adjusted under 35 U.S.C. 154(b) by 566 days.

(21) Appl. No.: 11/248,189

(22) Filed: Oct. 13, 2005

(65) Prior Publication Data

US 2006/0080962 A1    Apr. 20, 2006

(30) Foreign Application Priority Data

Oct. 14, 2004   (GB) ................. 0422865.6

(51) Int. Cl.
*F02C 7/24*   (2006.01)
*F02K 3/10*   (2006.01)

(52) U.S. Cl. .......................... 60/725; 60/764

(58) Field of Classification Search .................. 60/761, 60/39.281, 725, 762–766, 733
See application file for complete search history.

(56) References Cited

U.S. PATENT DOCUMENTS 4,312,185 A * 1/1982 Nash et al. ................. 60/739

5,428,951 A    7/1995  Wilson et al.
7,457,710 B2 * 11/2008  Schuermans et al. .......... 702/30

FOREIGN PATENT DOCUMENTS

GB    2 239 961 A    7/1991

* cited by examiner

*Primary Examiner*—Michael Cuff
*Assistant Examiner*—Gerald L Sung
(74) *Attorney, Agent, or Firm*—Oliff & Berridge, PLC

(57) ABSTRACT

A combustion device, such as an afterburner 4 for a gas turbine engine, comprises primary and secondary fuel delivery means 12, 20. Pressure fluctuations in the afterburner 4 are damped by reducing the supply of fuel through the primary fuel delivery means 12 during pressure peaks. This is achieved by means of a spill valve 18, controlled by a controller 22 in response to pressure in the afterburner 4 as sensed by a transducer 24. The spill valve 18 diverts a proportion of the fuel to the secondary fuel delivery means 20. The secondary fuel delivery means 20 is positioned upstream of the primary fuel delivery means 12 by a distance X, such that the secondary fuel delivery means serves to supply additional fuel to the combustion zone 26 during pressure troughs.

8 Claims, 1 Drawing Sheet

COMBUSTION DEVICE

This invention relates to a combustion device and is particularly, although not exclusively, concerned with a combustion device in the form of an afterburner of a gas turbine engine.

Combustion-induced instabilities arise in afterburners and other combustion devices. These tend to have a cyclic form, and create pressure fluctuations in the gas flow through the combustion device. The combustion-induced instabilities can create acoustic pressure fluctuations which may couple with the combustion-induced instabilities so causing them to grow larger, with potentially damaging effects on the structure of the combustion device.

In order to control such combustion-induced instabilities, GB 2239961 discloses a combustion device in the form of an afterburner comprising a duct in which a gas flow is established in operation, primary fuel delivery means being provided for delivering fuel to the duct, and control means being provided for controlling the primary fuel delivery means, the control means comprising a valve which is operable in response to pressure fluctuations in the duct to divert fuel from the primary fuel delivery means.

It is usual for the fuel to an afterburner of a gas turbine engine to be delivered from a pump through a metering arrangement. The metering arrangement can control the fuel flow rate to meet operating requirements, such as a required power output, but it cannot respond rapidly enough to adjust the fuel flow in response to pressure fluctuations. Such pressure fluctuations may typically have a frequency up to 120 Hz.

Consequently, control systems of the kind described in GB 2239961 have tended to use spill valves as the valve operable in response to the pressure fluctuations. A spill valve extracts a proportion of the fuel flowing between the measuring arrangement and the primary fuel delivery means leaving only the remainder to pass into the combustion device to be ignited. However, the management of the extracted fuel causes problems.

The extracted fuel may simply be dumped, but, if this is unacceptable, retrieval and storage measures are required, in the form of pumps, catch tanks and associated pipework. In many circumstances, the extracted fuel cannot be returned to the main fuel supply, since there is a risk that it will be contaminated, for example by hydraulic fluid picked up from the main fuel supply pump and metering arrangement.

According to the present invention, secondary fuel delivery means is provided upstream of the primary fuel delivery means with respect to the gas flow direction, the secondary fuel delivery means, in operation, receiving fuel diverted by the valve from the primary fuel delivery means.

The control means preferably comprises a pressure transducer exposed to the pressure within the duct. The control means may act to reduce the supply of fuel to the primary fuel delivery means during periods of increasing pressure, as detected by the pressure transducer. Additional control of combustion-induced instability can be achieved if the diverted fuel delivered by the secondary fuel delivery means reaches the axial position of the primary fuel delivery means during periods of reduced pressure in the duct. By way of example, the secondary fuel delivery means may be situated a distance upstream of the primary fuel delivery means which is in the range 0.5 to 1 m or more preferably in the range 0.6 to 0.8 m.

Thus, combustion-induced stability can be controlled by reducing the heat input at pressure peaks by reducing the supply of fuel through the primary fuel delivery means, and by increasing heat input at pressure troughs by increasing the supply of fuel through the secondary fuel delivery means.

In a preferred embodiment in accordance with the present invention, the combustion device is an afterburner of a gas turbine engine having a bypass duct, and the secondary fuel delivery means is disposed in the bypass duct.

For a better understanding of the present invention, and to show more clearly how it may be carried into effect, reference will now be made, by way of example, to the accompanying drawings, in which.

Figure 1:
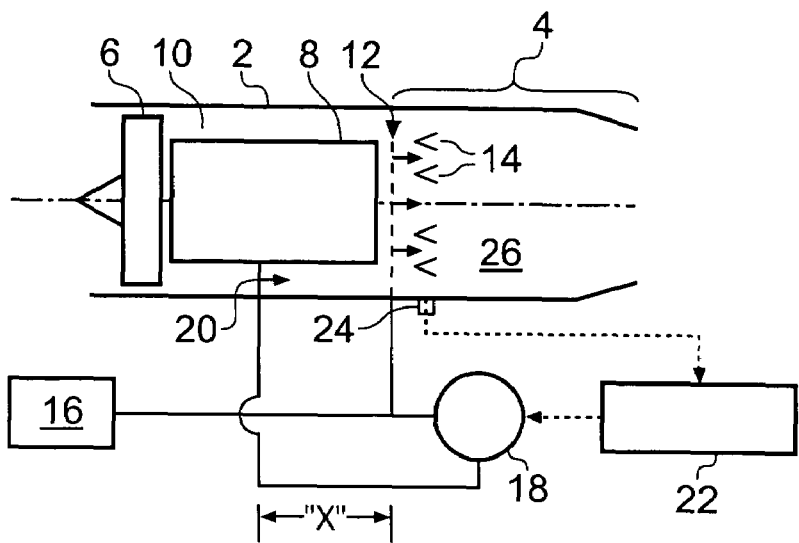
FIG. 1 is a schematic view of a gas turbine engine having an afterburner.

The engine shown in FIG. 1 comprises an engine casing 2, the downstream end of which defines a duct serving as an afterburner 4. The casing 2 encloses a fan 6 and a core engine 8 (comprising a compressor stage, combustion chambers and a turbine stage). A bypass duct 10 is provided between the casing 2 and the core engine 8. In operation, a flow of air, generated by the fan 6, passes through the bypass duct 10. The afterburner 4 is situated downstream of the core engine 8, and receives combustion products from the core engine 8 and air from the bypass duct 10. The afterburner 4 comprises primary fuel delivery means 12 and a flame holder structure 14. The primary fuel delivery means 12 may comprise an array of fuel spray bars, which may or may not be separately fuelled, and the flame holder structure 14 may comprise annular or radial elements having a profile which diverges in the downstream direction, with respect to the direction of gas flow through the engine.

Fuel is delivered to the spray bars 12 from a pump and metering arrangement indicated generally at 16. A spill valve 18 is branched off the direct line between the pump and metering arrangement 16 and the spray bars 12, and is connected so that, when open, it diverts a proportion of the flow from the pump and metering arrangement 16 to secondary fuel delivery means 20. The secondary fuel delivery means 20 may comprise a single fuel injector, or a plurality of fuel injectors distributed around the engine. As shown in FIG. 1, the secondary fuel delivery means 20 is positioned to deliver fuel into the bypass duct 10.

The spill valve 18 is controlled by a controller 22 which receives pressure signals from a transducer 24 exposed to the pressure within the afterburner 4.

In operation of the afterburner 4, fuel is supplied to the spray bars 12 from the pump and metering arrangement 16. Although the flow rate of the fuel delivered by the pump and metering arrangement 16 can be varied to meet the power requirements of the engine, such variation occurs relatively slowly and, for the purposes of the present description, it can be assumed that the output of the pump and metering arrangement 16 is constant.

The fuel is atomised as it emerges from the spray bars 12, and is mixed with the combustion gases from the core engine 8 and the air from the bypass duct 10. The flame holders 14 establish a desired flow pattern within the afterburner 4, and the mixture of fuel, air and combustion gases is ignited to form a flame in a combustion zone 26 downstream of the flame holders 14. The release of heat in the combustion process creates acoustic pressure waves which can become coupled with combustion-induced instabilities so providing a feedback response which can result in pressure fluctuations of sufficient size to cause structural damage to the components of the afterburner 4 or other engine or airframe components.

As disclosed in GB 2239961, active control of such acoustically coupled combustion instabilities can be achieved by an intermittent reduction in the flow of fuel to the spray bars 12, synchronised with the pressure fluctuations and having a suitable phase relationship. This is achieved by means of the spill valve 18 which is opened to divert fuel from the spray bars 12 in accordance with a signal from the controller 22, which contains a control algorithm to define the correct phase relationship. The controller 22 receives signals from the transducer 24, representing the instantaneous pressure in the afterburner 4 at the location of the transducer 24, which is positioned at or close to the combustion zone 26.

Thus, the spill valve 18 serves to reduce the flow rate of fuel to the spray bars 12 so as to reduce the energy released by combustion at pressure peaks during the pressure fluctuation cycle. This serves to damp the acoustic pressure fluctuations.

Figure 2:
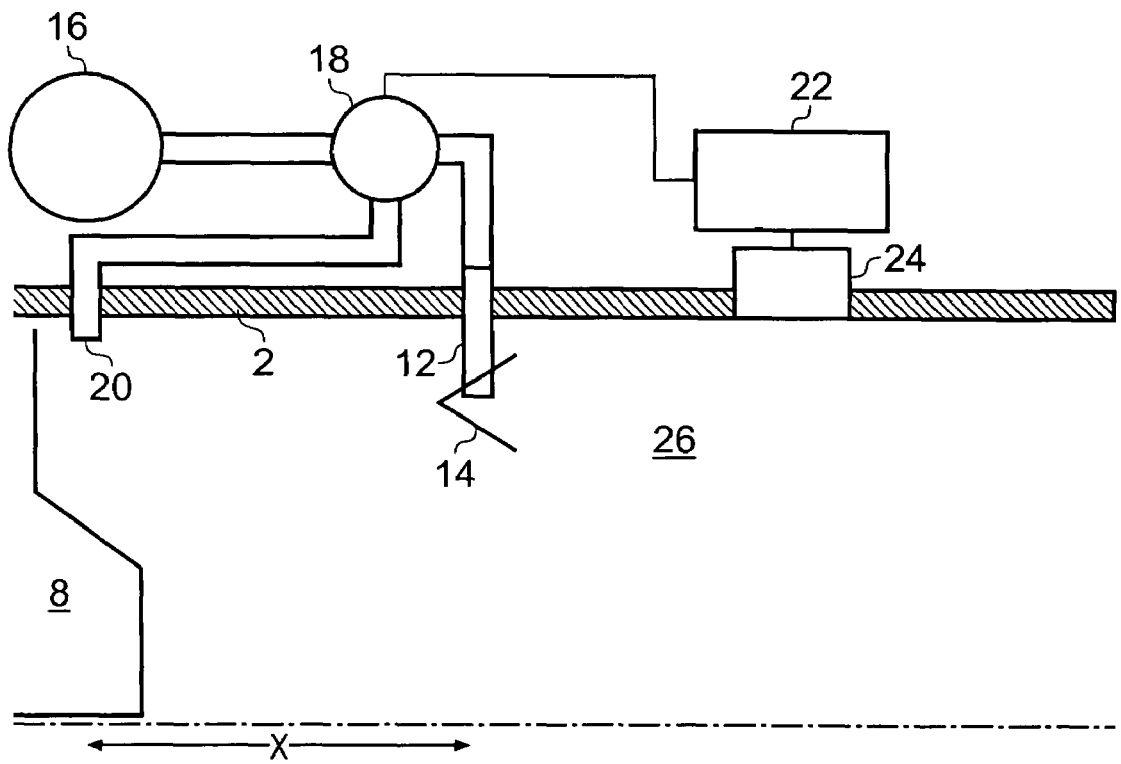
FIG. 2 is a diagrammatic view, on an enlarged scale, of part of the afterburner of the engine of FIG. 1.

In accordance with the present invention, the fuel diverted by the spill valve 18 is supplied to the secondary fuel delivery means in the form of the injector or injectors 20. As shown in FIG. 1, the injector 20 is positioned within the bypass duct 10 but alternative positions are possible. For example, in FIG. 2, the injector 20 is shown just downstream of the fan 6 and adjacent to the core engine 8.

Because of the intermittent or pulsed opening of the spill valve 18 controlled by the controller 22, the fuel delivered by the injector 20 will also be pulsed and will be discharged into the bypass duct 10 in "packets" at substantially the same time as the reduction in the flow rate of fuel discharged from the spray bars 12. Because the "packet" of fuel delivered by the injector 20 is discharged upstream of the spray bars 12, that "packet" will reach the combustion zone 26 some time after the corresponding reduced flow of fuel from the spray bars 12. By appropriate selection of the distance X between the injector 20 and the spray bars 12, it is possible for the "packet" of fuel delivered by the injector 20 to reach the combustion zone 26 at a time when the pressure in the combustion zone 26 is at or approaching its lowest value in the cycle of pressure fluctuation. Thus, the fuel delivered by the injector 20 serves to increase the heat released at the troughs in the pressure fluctuation cycle, so as to provide additional damping of the acoustic pressure fluctuations.

The distance X will vary from engine to engine, depending on the gas flow rate through the engine, and in particular through the bypass duct 10, and on the frequency of the pressure fluctuations created in the afterburner 4. For a typical engine, it has been established that an appropriate distance X is approximately 0.7 m, although it will be appreciated that, for different engines, the distance may vary, for example within the range 0.5 to 1 m, or 0.6 to 0.8 m.

It will be appreciated that the present invention provides a mean for damping pressure fluctuations within the afterburner 4 by decreasing the fuel flow through the spray bars 12, and so, decreasing the release heat when the pressure is highest, and by increasing the release of heat, by means of the fuel delivered by the injector 20, when the pressure is lowest. Furthermore, the problem of dealing with the fuel diverted by the spill valve 18 from the spray bars 12 is overcome by supplying that fuel to the injector 20.

Although the present invention has been described in the context of the afterburner 4 of a gas turbine engine, it may be applied also in other combustion devices where acoustically coupled combustion-induced instabilities may arise.

The invention claimed is:

1. A combustion device for an engine comprising:
    a duct for conveying a gas flow established in operation;
    primary fuel delivery means for delivering fuel to the duct;
    secondary fuel delivery means for delivering fuel to the duct;
    a combustion region disposed downstream of the primary fuel delivery means and the secondary fuel delivery means; and
    control means comprising:
        a pressure transducer responsive to fluctuating pressure in the duct, and
        a valve arranged to divert fuel from the primary fuel delivery means in response to the fluctuating pressure in the duct, wherein
            the control means controls the valve for reducing the flow of fuel to the primary fuel delivery means in synchronism with peaks in the fluctuating pressure in the duct by diverting the fuel from the primary fuel delivery means to the secondary fuel delivery means, wherein
            the secondary fuel delivery means discharges the fuel into the duct and is disposed at an axial distance upstream of the primary fuel delivery means with respect to a direction of the gas flow, the axial distance selected such that the fuel discharged from the secondary fuel delivery means is capable of reaching the combustion region at troughs in the fluctuating pressure in the duct.

2. The combustion device of claim 1, wherein the axial distance between the primary fuel delivery means and the secondary fuel delivery means is not less than 0.5 m and not more than 1 m.

3. The combustion device of claim 2, wherein the axial distance is not less 0.6 m and not more than 0.8 m.

4. The combustion device of claim 1, further comprising an afterburner for a gas turbine engine.

5. The combustion device of claim 4, wherein the secondary fuel delivery means is disposed to deliver fuel to a bypass duct of the gas turbine engine.

6. The combustion device of claim 1, wherein the axial distance is calculated based on characteristics of the engine including at least one of a gas flow rate through the engine, a gas flow rate through the duct, and a frequency of the fluctuating pressure in the duct.

7. The combustion device of claim 1, wherein the duct encloses a core engine and the secondary fuel delivery means is disposed adjacent to the core engine.

8. The combustion device of claim 1, wherein the duct encloses a core engine and the secondary fuel delivery means is disposed downstream of the core engine.

* * * * *